United States Patent [19]
Suzuki et al.

[11] Patent Number: 4,505,600
[45] Date of Patent: Mar. 19, 1985

[54] TEMPERATURE SENSOR

[75] Inventors: Takashi Suzuki; Tetsuo Kimura, both of Tokyo; Seiichi Tanaka, Chiba, all of Japan

[73] Assignee: Nittan Company, Ltd., Tokyo, Japan

[21] Appl. No.: 552,391

[22] Filed: Nov. 16, 1983

[30] Foreign Application Priority Data

Nov. 18, 1982 [JP] Japan ................................ 57-201185

[51] Int. Cl.³ .............................................. G01K 7/00
[52] U.S. Cl. ...................................... 374/170; 374/163
[58] Field of Search ............... 374/170, 171, 181, 185, 374/163, 182, 173; 364/557; 307/310, 318

[56] References Cited

U.S. PATENT DOCUMENTS

| | | | |
|---|---|---|---|
| 3,461,724 | 8/1969 | Toog et al. | 374/163 |
| 3,620,082 | 11/1971 | Peters | 374/170 |
| 4,068,138 | 1/1978 | Miyakawa et al. | 374/170 |
| 4,125,023 | 11/1978 | Amemiya et al. | 374/170 |
| 4,413,917 | 11/1983 | Cooper | 374/173 |
| 4,448,549 | 5/1984 | Hashimoto et al. | 374/170 |

Primary Examiner—Charles Frankfort
Assistant Examiner—David R. Schuster
Attorney, Agent, or Firm—Hill, Van Santen, Steadman & Simpson

[57] ABSTRACT

A temperature sensor has a series circuit of resistors, a gain control switch connected in parallel with one of the resistors of the series circuit, and a reference voltage control switch connected in parallel with a middle resistor of resistors of a reference voltage generation section. The reference voltage and the gain of an operational amplifier are variable so as to change the resolution of the output signal and/or a detected temperature range of the sensor.

7 Claims, 2 Drawing Figures

DETECTED TEMPERATURE

TEMPERATURE SENSOR

BACKGROUND OF THE INVENTION

The present invention relates to a temperature sensor applicable in a variety of applications such as fire alarm equipment and air conditioning equipment.

Various types of temperature sensors have been used in home fire alarm systems and home air conditioning systems, respectively. In order to eliminate time-consuming installation and to decrease installation expense, there arises a demand for a single temperature sensor used for both the fire alarm system and the air conditioning system. However, a temperature sensor for a fire alarm system must be used in a wide temperature range (e.g., 40° C. to 90° C.), but is not required to generate highly precise detection signals, as compared with detection signals generated by a temperature sensor for an air conditioning system. Although the temperature sensor for the air conditioning system must produce a highly precise signal (resolution of the signal must be given in units of 0.1° C.), it can be used in a narrow temperature range (e.g., 10° C. to 30° C.). In this manner, the temperature sensors for the alarm system and the air conditioning system have different specifications. As a result, many problems are presented when a single temperature sensor is used for both the first alarm system and the air conditioning system. In order to eliminate these problems, a single temperature sensor which can be used in the temperature range of 10° C. to 90° C. and can detect signals in units of 0.1° C. is required. However, the manufacturing cost of such a temperature sensor is high, and the amount of transmission data is greatly increased.

SUMMARY OF THE INVENTION

It is, therefore, an object of the present invention to provide a temperature sensor which does not require a large transmission capacity and which can generate sufficient signals for various types of equipment.

In order to achieve the above object of the present invention, there is provided a temperature sensor used for systems having different temperature detection characteristics, comprising: a temperature detection section having a first series circuit of a first resistor and a platinum resistor; a reference voltage generation section having a second series circuit of second to fourth resistors; an operational amplifier for amplifying a difference between analog voltage signals received from the temperature detection section and the reference voltage generation section; voltage regulating means for regulating the analog voltage signals supplied to the operational amplifier; and an analog-to-digital converter for converting an amplified analog signal from the operational amplifier to a digital signal.

DETAILED DESCRIPTION OF THE PREFERRED EMBODIMENT

A temperature sensor according to an embodiment of the present invention will be described in detail with reference to the accompanying drawings.

Figure 1:
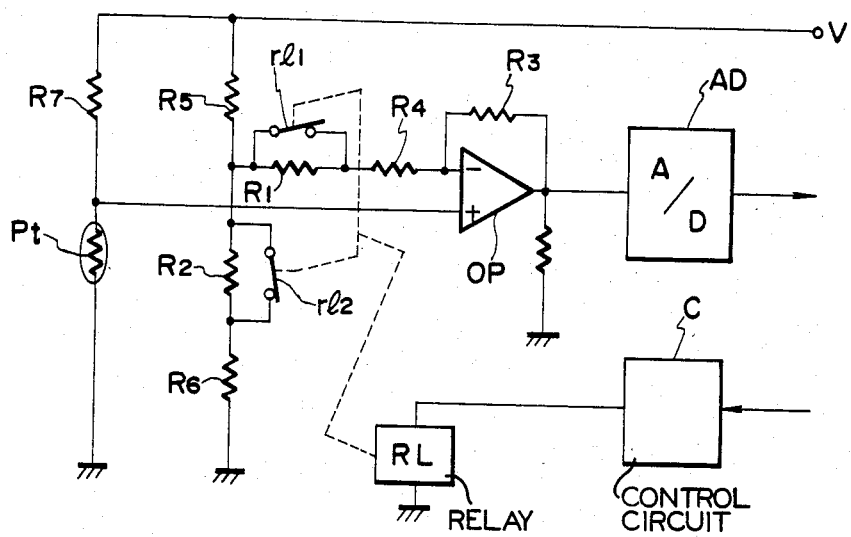
FIG. 1 is a circuit diagram of a temperature sensor according to a preferred embodiment of the present invention.

FIG. 1 is a circuit diagram of a temperature sensor according to the embodiment of the present invention. A series circuit of a resistor $R_7$ and a platinum resistor $P_t$ constitutes a temperature detection section. A series circuit of resistors $R_5$, $R_2$, and $R_6$ constitutes a reference voltage generation section. The noninverting input terminal of an operational amplifier OP is connected to a junction between the resistors $R_7$ and $P_t$, and the inverting input terminal of the operational amplifier OP is connected to a junction between the resistors $R_5$ and $R_2$ through a series circuit of resistors $R_1$ and $R_4$. The output terminal of the operational amplifier OP is connected to an A/D converter AD. A digital signal from the A/D converter AD is used for systems such as a fire alarm system and an air conditioning system.

The principle feature of the present invention will now be described hereinafter. A reference voltage control switch $rl_2$ is connected in parallel with the resistor $R_2$ of the reference voltage generation section. An amplifier gain control switch $rl_1$ is connected in parallel with the resistor $R_1$ of the series circuit connected to the operational amplifier OP. The switches $rl_1$ and $rl_2$ are operated by a relay RL which is controlled by a control circuit C.

Figure 2:
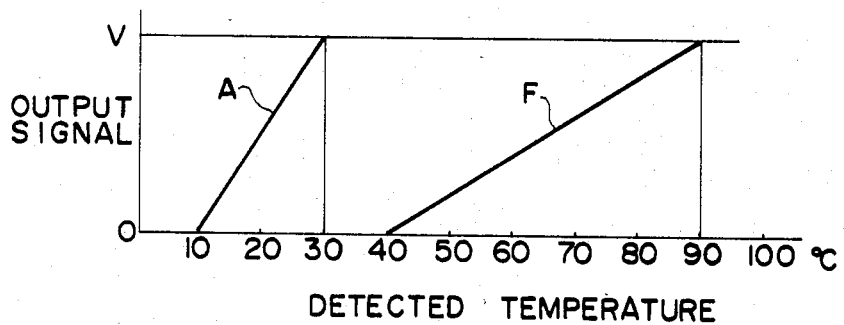
FIG. 2 is a graph showing the output signal as a function of the detected temperature so as to explain the operation of the temperature sensor shown in FIG. 1.

The operation of the temperature sensor having the arrangement described above will be described with reference to a graph (FIG. 2) showing the output signal as a function of the detected temperature. A gain G of the operational amplifier OP is substantially given as follows:

$$G \approx R_3/(R_1+R_3)$$

A reference voltage $V_0$ of the reference voltage generation section is substantially given as follows:

$$V_0 \approx V \cdot (R_2+R_6)/(R_5+R_2+R_6)$$

where V is the power supply voltage.

Now assume that the temperature sensor is used as a sensor for an air conditioning system. The switches $rl_1$ and $rl_2$ are closed in response to a control signal from the control circuit C, as shown in FIG. 1. The reference voltage $V_0$ is decreased, and the gain G of the operational amplifier OP is increased. In this state, the output signal from the temperature sensor is indicated by a straight line A. A sufficient output voltage within the temperature range of 10° C. to 30° C. can be generated by the operational amplifier OP. In other words, sufficient resolution can be obtained in the output signal of the sensor to be suitable as a sensor for the air conditioning system.

On the other hand, assume that the temperature sensor is used as a sensor for a fire alarm system. The switches $rl_1$ and $rl_2$ are opened in response to a control signal from the control circuit C. The reference voltage $V_0$ is increased, and the gain G of the operational amplifier OP is decreased. Therefore, the output signal from the temperature sensor becomes as indicated by a straight line F in FIG. 2. The output signal can indicate a temperature change within a wide range of 40° C. to 90° C., and be generated from the operational amplifier OP. In other words, the resolution of this output signal is not very high, but the detection temperature range is sufficiently wide. In this state, the temperature sensor can be properly used as a sensor for the fire alarm system.

The output from the operational amplifier OP is then quantized by the A/D converter AD, and a digital signal is transmitted to a receiver. The receiver can determine a detected temperature indicated by a level of the digital signal in accordance with the state of the control circuit C. The number of bits of the A/D converter is properly selected in accordance with a minimum resolution of the signal which is required by both the fire alarm system and the air conditioning system. In this manner, according to the temperature sensor of the present invention, a minimum capacity of transmission data is required corresponding to a sufficient number of signals required for the individual systems.

In the above embodiment, both the output from the reference voltage generation section and the gain of the operational amplifier are controlled. However, when only the output from the reference voltage generation section is controlled, only a detected temperature range can change. Furthermore, when only the gain of the operational amplifier is controlled, only the resolution of the signal within the detected temperature range can change. These modifications can be selected as needed.

Although various minor changes and modifications might be proposed by those skilled in the art, it will be understood that we wish to include within the claims of the patent warranted hereon all such changes and modifications as reasonably come within our contribution to the art.

We claim as our invention:

1. A temperature sensor, comprising:
a temperature detection section;
a reference voltage generation section;
means for generating a temperature detection signal such that an output from said temperature detection section and an output from said reference voltage generation section are differentially compared and amplified by an operational amplifier;
control circuit means for selectively changing an output characteristic of said operational amplifier relative to the output from the temperature detection section so that the temperature sensor can be employed in a variety of applications requiring different temperature sensing sensitivities or temperature sensing ranges;
said reference voltage generation section comprising a series circuit of first to third resistors; and
said control circuit means comprising
a first switch means connected in parallel with said second resistor for controlling a reference voltage such that the reference voltage is decreased when said first switch means is closed,
a second switch means for controlling a gain of said operational amplifier such that the gain is increased when said second switch means is closed,
a series circuit of fourth and fifth resistors which is connected between said operational amplifier and a connecting point between said first resistor and said second resistor, said fourth resistor being connected in parallel with said second switch means,
a relay means commonly connected to said first and second switch means for controlling said first and second switch means, and
control means for controlling an operation of said relay means.

2. A temperature sensor, comprising:
a temperature detection section;
a reference voltage generation section;
means for generating a temperature detection signal such that an output from said temperature detection section and an output from said reference voltage generation section are differentially compared and amplified by an operational amplifier;
control circuit means for selectively changing an output characteristic of said operational amplifier relative to the output from the temperature detection section so that the temperature sensor can be employed in a variety of applications requiring different temperature sensing sensitivities or temperature sensing ranges;
said reference voltage generation section comprising a series circuit of first to third resistors; and
said control circuit means comprising
a switch means connected in parallel with said second resistor for controlling a reference voltage such that the reference voltage is decreased when said switch means is closed,
a series circuit of fourth and fifth resistors which is connected between said operational amplifier and a connecting point between said first resistor and said second resistor,
a relay means connected to said switch means for controlling said switch means, and
a relay control circuit means for controlling an operation of said relay means.

3. A temperature sensor, comprising:
a temperature detection section;
a reference voltage generation section;
means for generating a temperature detection signal such that an output from said temperature detection section and an output from said reference voltage generation section are differentially compared and amplified by an operational amplifier;
control circuit means for selectively changing an output characteristic of said operational amplifier relative to the output from the temperature detection section so that the temperature sensor can be employed in a variety of applications requiring different temperature sensing sensitivities or temperature sensing ranges;
said reference voltage generation section comprising a series circuit of first to third resistors; and
said control circuit means comprising
a switch means for controlling a gain of said operational amplifier such that the gain is increased when said switch means is closed,
a series circuit of fourth and fifth resistors which is connected between said operational amplifier and a connecting point between said first resistor and said second resistor, said fourth resistor being connected in parallel with said switch means,
a relay means connected to said switch for supplying a control signal to said switch, and
a relay control circuit means for controlling an operation of said relay.

4. A temperature sensor, comprising:

a temperature detecting means for providing a temperature voltage responsive to temperature;

a reference voltage generating means for producing a reference voltage;

an operational amplifier means for creating an output signal and having a first input always connected to receive the reference voltage and a second input connected to receive the temperature voltage;

gain control means connected to the first input of the operational amplifier means for changing a gain thereof;

first switch means connected to the reference voltage generating means for selectively changing the reference voltage applied to the first input depending upon an application to which the temperature sensor is put;

second switch means connected to the gain control means for selectively changing a gain of the operational amplifier means depending upon an application to which the temperature sensor is put; and control means to commonly activate both the first and second switch means substantially simultaneously.

5. A temperature sensor according to claim 4 wherein an analog-to-digital converter is provided in an output of the operational amplifier means.

6. A temperature sensor according to claim 4 wherein the gain control means comprises a feedback resistance between an output of the operational amplifier means and an inverting input and a resistance connected in series with the inverting input whose resistance is changed selectively by the second means.

7. A temperature sensor whose output signal characteristics can be selectively changed depending upon an application to which the temperature sensor is put without changing a temperature sensing platinum resistor employed in the sensor, comprising:

a voltage source;

a first resistor connected in series with a temperature sensing resistor across the voltage source;

a reference voltage circuit comprising second, third, and fourth resistors connected in series across the voltage source with a voltage reference being taken between the second and third resistors;

an operational amplifier having an inverting and noninverting input;

a feedback resistance connected between an output of the amplifier and the inverting input;

fourth and fifth series-connected resistors connected between the inverting input and a junction between the second and third resistors; and means for selectively shorting the fourth resistor and third resistor so as to simultaneously change an operating point and gain of the operational amplifier depending upon an application to which the temperature sensor is put.

* * * * *